US012630357B1

(12) United States Patent
Kincart

(10) Patent No.: US 12,630,357 B1
(45) Date of Patent: May 19, 2026

(54) METHOD OF USE FOR A LOCK FOR ROLL OFF CONTAINER

(71) Applicant: Robert Jeffrey Kincart, Bartow, FL (US)

(72) Inventor: Robert Jeffrey Kincart, Bartow, FL (US)

( * ) Notice: Subject to any disclaimer, the term of this patent is extended or adjusted under 35 U.S.C. 154(b) by 460 days.

(21) Appl. No.: 18/142,089

(22) Filed: May 2, 2023

Related U.S. Application Data

(63) Continuation-in-part of application No. 17/718,431, filed on Apr. 12, 2022, now Pat. No. 12,123,224.

(51) Int. Cl.
*B65F 1/14* (2006.01)

(52) U.S. Cl.
CPC .................................... *B65F 1/14* (2013.01)

(58) Field of Classification Search
CPC .... B65F 1/14; B65F 7/00; B65F 7/005; B65F 3/041; B60P 1/4407; B60P 1/6427; B60P 1/6454; B60P 1/48; B60P 1/483
See application file for complete search history.

(56) References Cited

U.S. PATENT DOCUMENTS

| | | | | |
|---|---|---|---|---|
| 2009/0188844 | A1* | 7/2009 | Davis | C10L 5/46 209/659 |
| 2012/0012588 | A1* | 1/2012 | Shield | E05B 47/026 220/315 |
| 2013/0269400 | A1* | 10/2013 | Miller | E05B 73/00 70/63 |
| 2015/0348252 | A1* | 12/2015 | Mask | G06V 20/52 382/103 |
| 2016/0333612 | A1* | 11/2016 | Hess | E05B 73/00 |
| 2023/0051109 | A1* | 2/2023 | Viano | B65D 90/66 |
| 2023/0406615 | A1* | 12/2023 | Sedory | B65D 90/023 |

* cited by examiner

*Primary Examiner* — Glenn F Myers
(74) *Attorney, Agent, or Firm* — Kyle A. Fletcher, Esq.

(57) ABSTRACT

The method of use for a lock for a roll off container is a process. The method of use for a lock for a roll off container ensures that any cargo loaded onto the roll off container is "clean." By clean is meant that the cargo does not include any unauthorized material. By unauthorized material is meant that the cargo does not include items that carrier was not contracted to transport.

7 Claims, 7 Drawing Sheets

METHOD OF USE FOR A LOCK FOR ROLL OFF CONTAINER

CROSS REFERENCES TO RELATED APPLICATIONS

This non-provisional application is a continuation-in-part application filed under 37 CFR 1.53(b) that claims the benefit of United States 35 USC 120 from non-provisional application U.S. Ser. No. 17/718,431 filed on Apr. 12, 2022, by the inventor: J. Kincart. This non-provisional application incorporates non-provisional application U.S. Ser. No. 17/718,431 in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of refuse or waste receptacles and accessories therefor. (B65F1/00)

Background

This application claims the benefit of United States 35 USC 120 from non-provisional application U.S. Ser. No. 17/718,431 (hereinafter prior disclosure). The prior disclosure discloses a locking mechanism 200 and a roll-off container 900. The roll-off container 900 further comprises a hook mechanism 910. The hook mechanism 910 is a mechanical structure. The hook mechanism 910 forms an anchor point that allows the roll-off container 900 to be pulled onto or "rolled off" of a truck. The locking mechanism 200 removably attaches to the hook mechanism 910. The locking mechanism 200 is locked onto the hook mechanism 910. The locking mechanism 200 attaches to the locking mechanism 200 such that the locking mechanism 200 disables the use of the hook mechanism 910 as an anchor point.

SUMMARY OF INVENTION

The method of use for a lock for a roll off container is a process. The method of use for a lock for a roll off container describes a process for the use of the locking mechanism that was disclosed in the prior disclosure. The method of use for a lock for a roll off container ensures that any cargo loaded onto the roll off container is "clean." By clean is meant that the cargo does not include any unauthorized material. By unauthorized material is meant that the cargo does not include items that carrier was not contracted to transport. Examples of unauthorized material include, but are not limited to: hazardous materials such as biological, chemical, and radioactive waste products. The method of use for a lock for a roll off container comprises: a) the delivery of the roll-off container to a loading site; b) disabling the roll-off container reloading; c) loading the roll-off container with cargo; d) inspecting loaded cargo for unauthorized material; e) enabling the roll-off container for reloading; f) loading the roll-off container for transport, and g) sending the roll-off container to the proper disposal facility.

These together with additional objects, features and advantages of the method of use for a lock for a roll off container will be readily apparent to those of ordinary skill in the art upon reading the following detailed description of the presently preferred, but nonetheless illustrative, embodiments when taken in conjunction with the accompanying drawings.

In this respect, before explaining the current embodiments of the method of use for a lock for a roll off container in detail, it is to be understood that the method of use for a lock for a roll off container is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the method of use for a lock for a roll off container.

It is therefore important that the claims be regarded as including such equivalent construction insofar as they do not depart from the spirit and scope of the method of use for a lock for a roll off container. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
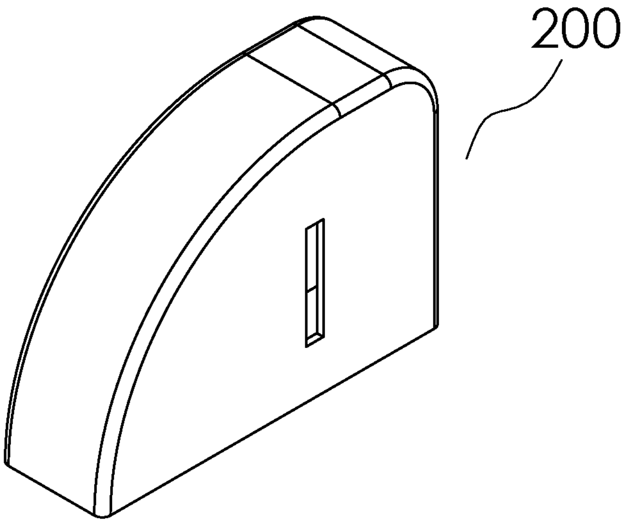
FIG. 1 is a perspective view of an embodiment of the disclosure.
Figure 2:
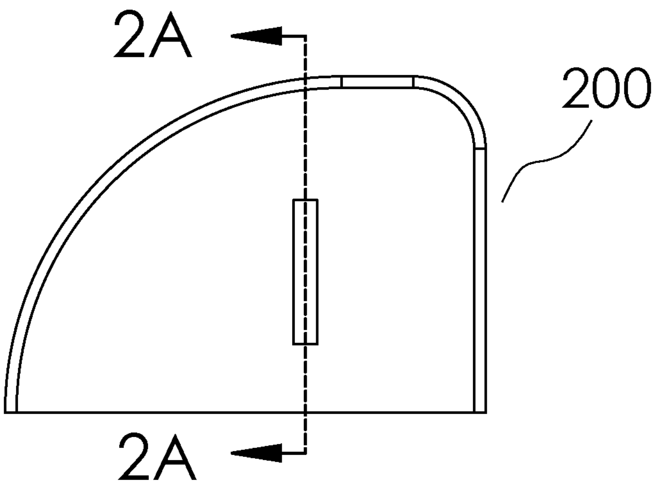
FIG. 2 is a front view of an embodiment of the disclosure.
Figure 2A:
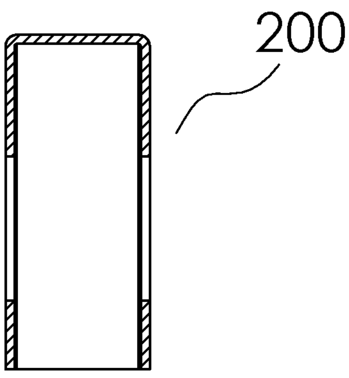
FIG. 2A is a cross-sectional view of an embodiment of the disclosure across 2A-2A as shown in FIG. 2.
Figure 3:
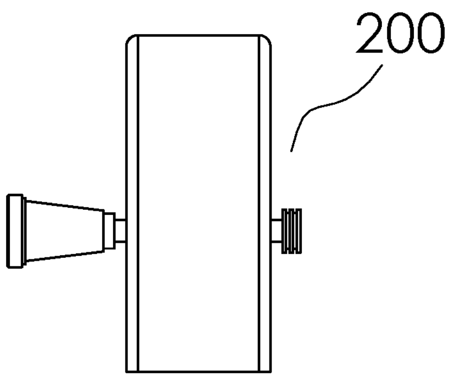
FIG. 3 is a side view of an embodiment of the disclosure.
Figure 4:
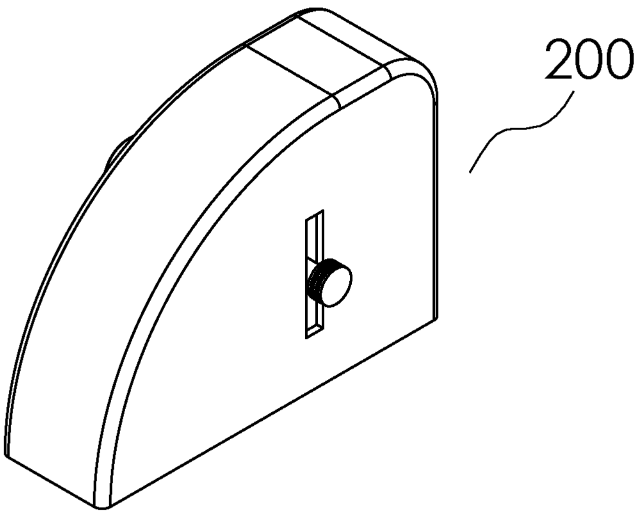
FIG. 4 is a reverse perspective view of an embodiment of the disclosure.
Figure 5:
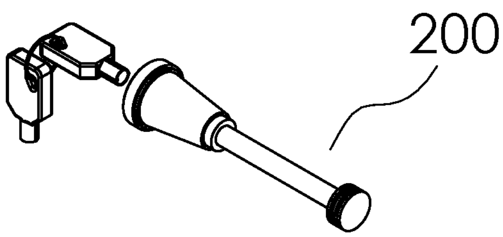
FIG. 5 a detail view of an embodiment of the disclosure.
Figure 6:
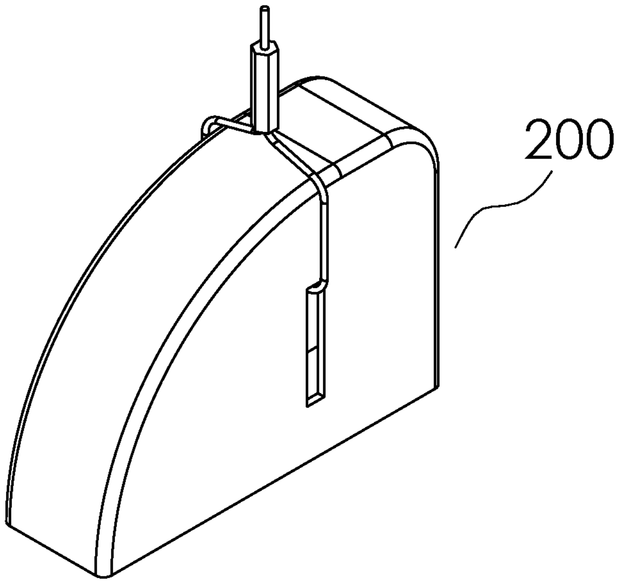
FIG. 6 is a perspective view of an alternate embodiment of the disclosure.
Figure 7:
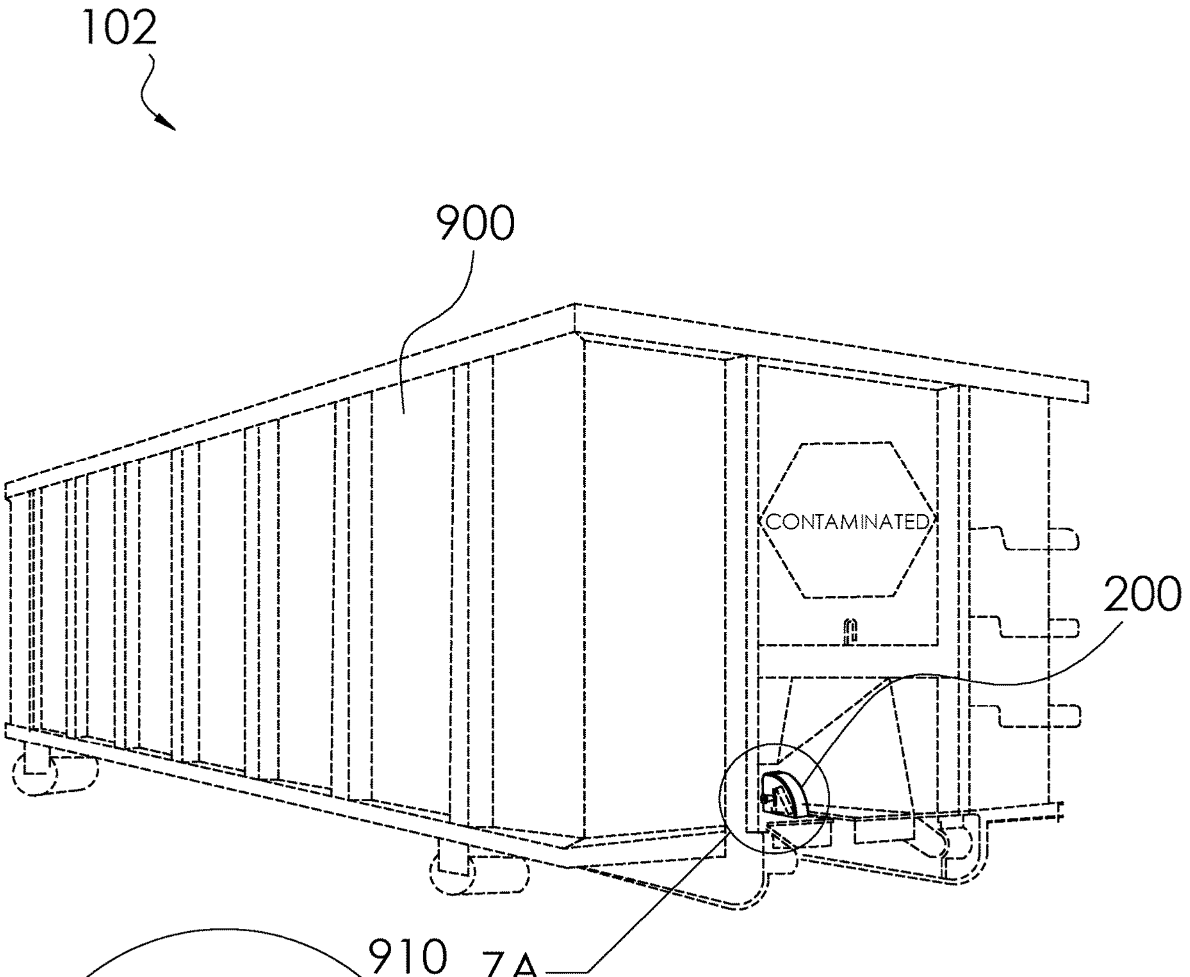
FIG. 7 is an in-use view of an embodiment of the disclosure.
Figure 7A:
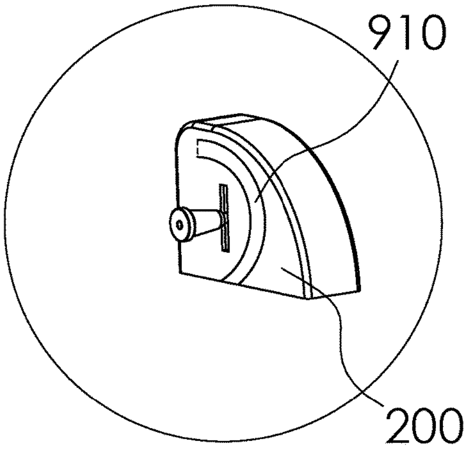
FIG. 7A a detail view of an embodiment of the disclosure.
Figure 8:
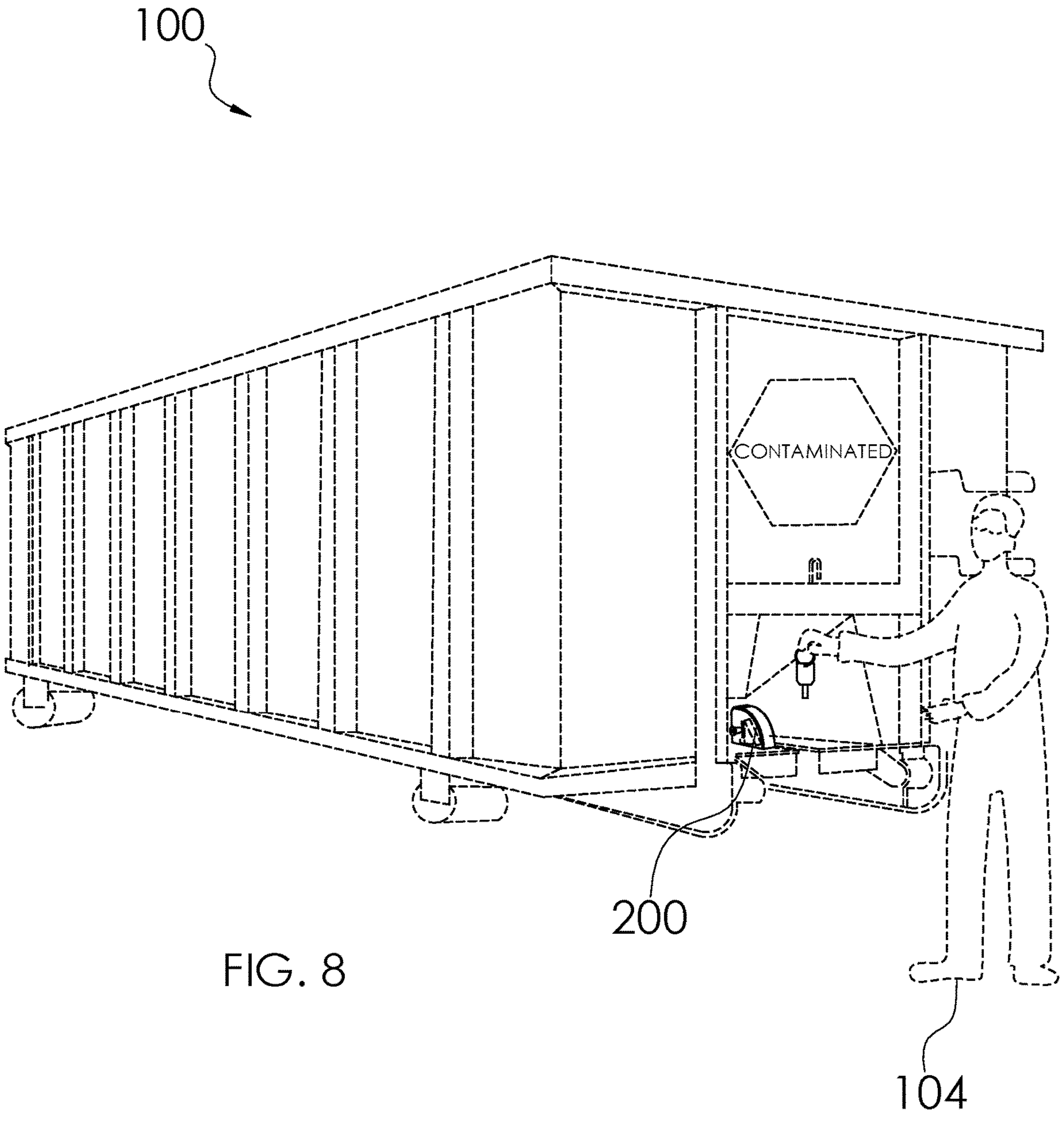
FIG. 8 is an in-use view of an embodiment of the disclosure.
Figure 9:
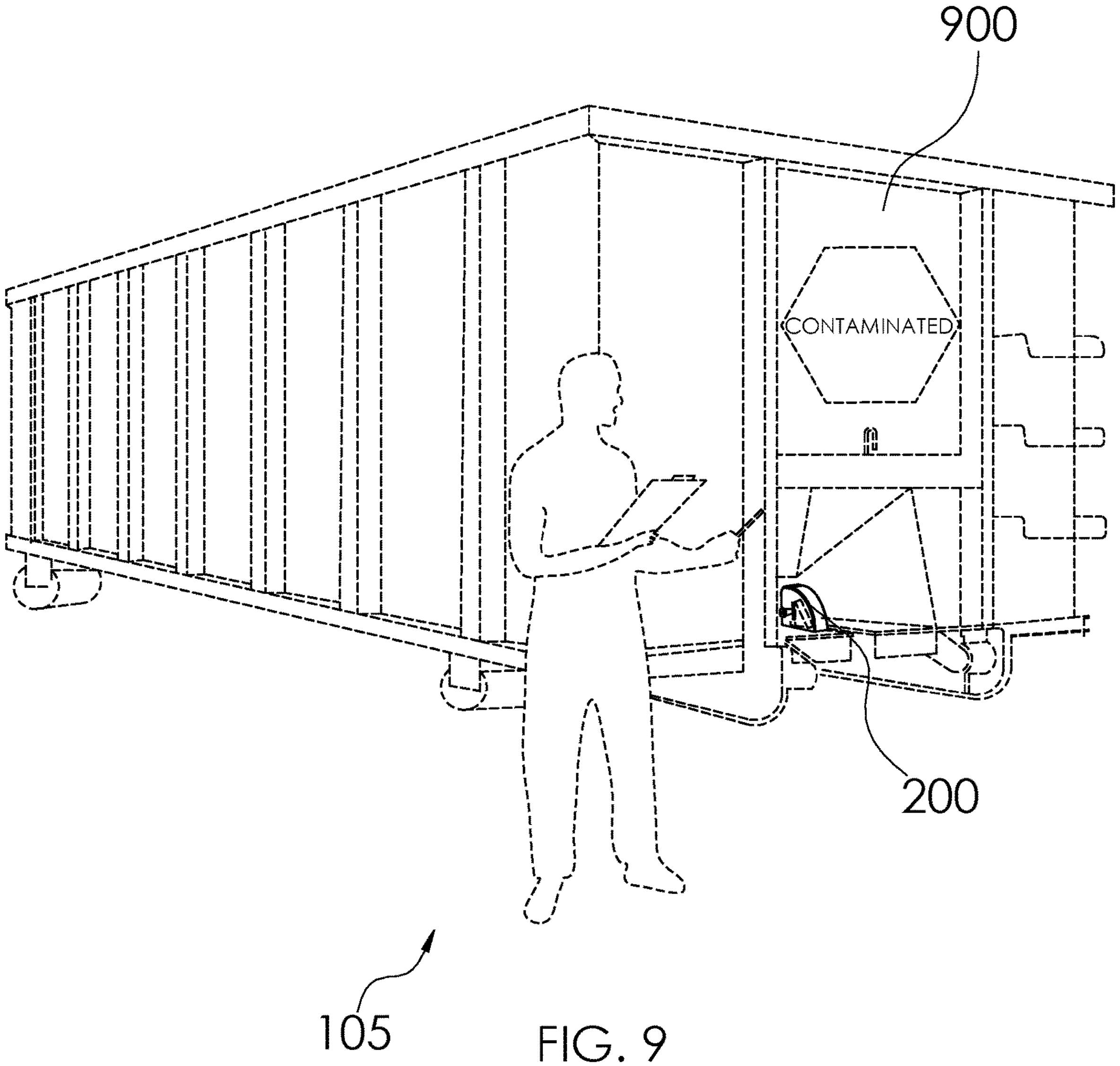
FIG. 9 a detail view of an embodiment of the disclosure.
Figure 10:
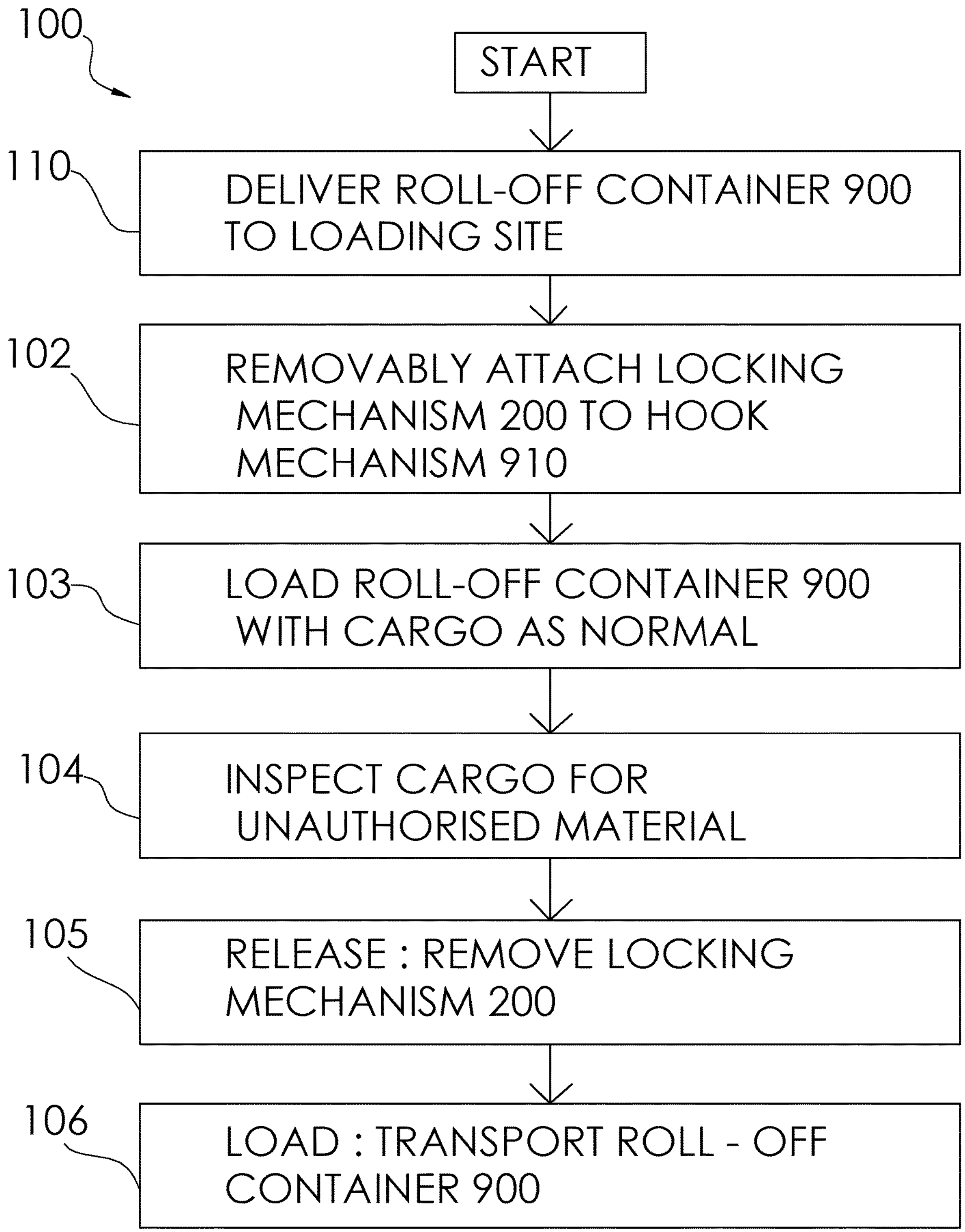
FIG. 10 is a flow diagram of an embodiment of the disclosure.

Detailed reference will now be made to one or more potential embodiments of the disclosure, which are illustrated in FIGS. 1 through 10.

The method of use for a lock for a roll off container 100 (hereinafter invention) is a process. The invention 100 describes a process for the use of the locking mechanism 200 that was disclosed in the prior disclosure. The invention 100 ensures that any cargo loaded into the roll off container 900 is "clean." By clean is meant that the cargo does not include any unauthorized material. By unauthorized material is meant that the cargo does not include items that carrier was not contracted to transport. Examples of unauthorized material include, but are not limited to: hazardous materials such as biological, chemical, and radioactive waste products. The invention 100 comprises: a) the delivery of the roll-off container 900 to a loading site 101; b) disabling the roll-off container 900 reloading 102; c) loading the roll-off container 900 with cargo 103; d) inspecting loaded cargo for unauthorized material 104; e) enabling the roll-off container 900 for reloading 105; and, f) loading the roll-off container 900 for transport 106.

The delivering the roll-off container 900 to a loading site 101 process is completed before the disabling the roll-off container 900 reloading 102 process is initiated. The disabling the roll-off container 900 reloading 102 process is completed before the loading the roll-off container 900 with cargo 103 process is initiated. The loading the roll-off container 900 with cargo 103 process is completed before the inspecting loaded cargo for unauthorized materials 104 process is initiated. The inspecting loaded cargo for unauthorized materials 104 process is completed before the enabling the roll-off container 900 for reloading 105 process is initiated. The enabling the roll-off container 900 for reloading 105 process is completed before the loading the roll-off container 900 for transport 106 process is initiated.

The delivering the roll-off container 900 to a loading site 101 process involves delivering the roll-off container 900 to the location where cargo is to be collected. Specifically, a truck drives the roll-off container 900 to a previously determined location and then positions the roll-off container 900 in a location suitable for use in loading the roll-off container 900 with cargo. The truck is then detached from the hook mechanism 910 of the roll-off container 900. The truck is left in a condition to receive cargo for future transport. The roll-off container 900 is left in a condition to receive cargo.

The disabling the roll-off container 900 reloading 102 process involves attaching the locking mechanism 200 to the hook mechanism 910 of the roll-off container 900. The hook mechanism 910 forms the anchor point of the roll-off container 900 that a truck attaches to load and unload the roll-off container 900. The locking mechanism 200 installs on the hook mechanism 910. The locking mechanism 200 forms an enclosure around the hook mechanism 910 that prevents a truck from attaching to the hook mechanism 910. The locking mechanism 200 is a locking structure that fixes the locking mechanism 200 to the hook mechanism 910 when the locking mechanism 200 is in a locked configuration. The locking mechanism 200 can be removed from the hook mechanism 910 when the locking mechanism 200 is in an unlocked configuration. The removal of the locking mechanism 200 from the hook mechanism 910 provides access to the hook mechanism 910.

The loading of the roll-off container 900 with cargo 103 process involves loading the cargo intended for transport into the roll-off container 900. The roll-off container 900 receives the cargo in its normal manner. More specifically, the attachment of the locking mechanism 200 to the hook mechanism 910 does not impede the loading of the cargo into the roll-off container 900.

The inspecting loaded cargo for unauthorized materials 104 process involves the inspection of the cargo for unauthorized materials. An appropriate authority physically inspects the cargo for unauthorized materials. The appropriate authority:

a) is an individual authorized to inspect the loaded cargo; and, b) is further authorized to release the locking mechanism 200 from its locked configuration.

The enabling the roll-off container 900 for reloading 105 process involves: a) the completion of the inspection of the cargo; b) the determination by the appropriate authority that the cargo does not contain unauthorized material; and, c) the approval of the appropriate authority to release the locking mechanism 200. By releasing the locking mechanism 200 is meant that the locking mechanism 200 is physically unlocked and removed from the hook mechanism 910.

The loading the roll-off container 900 for transport 106 process involves reloading the released roll-off container 900 with its cargo onto a truck for subsequent transport. It shall be noted that in concert with this step, the released roll-off container 900 is being sent to the proper disposal facility.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Appropriate Authority: As used in this disclosure, an appropriate authority is a previously determined person or organization that is designated to monitor compliance with, and if necessary enforce, contractual, regulatory, and legal mandates.

Cargo: As used in this disclosure, cargo refers to one or more objects that are intended to be transported using a vehicle. The term freight is a synonym for cargo.

Closed Position: As used in this disclosure, a closed position refers to a moving structure that is in an orientation that prevents the insertion of a first object into a second object. The closed position is often referred to as an object being "closed."

Container: As used in this disclosure, a container is a structure that forms a protected space (or protection space) used to store and transport an object. The term containment structure is a synonym for container. Use protected space or protection space.

Fastener: As used in this disclosure, a fastener is a device that is used to removably attach a first object to a second object. A fastener is often referred to as a fastening device.

Lock: As used in this disclosure, a lock is a device that prevents the unauthorized entry into or operation of a device.

Open Position: As used in this disclosure, an open position refers to a moving structure that is in an orientation that presents that allows the insertion of a first object into a second object. The open position is often referred to as an object being "open."

Orientation: As used in this disclosure, orientation refers to the positioning of a first object relative to: 1) a second object; or, 2) a fixed position, location, or direction.

Roll: As used in this disclosure, the term roll refers to the rotation of an object around an axis or center of rotation. The term roll is often used in the context of the motion of an object that is facilitated by the rotation of one or more wheels or casters.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

With respect to the above description, it is to be realized that the optimum dimensional relationship for the various components of the invention described above and in FIGS. 1 through 10 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A method of use for lock with roll off container comprising a) a delivery of a roll-off container to a loading site; b) a disabling the roll-off container reloading process; c) a loading the roll-off container with cargo process; d) an inspecting loaded cargo for unauthorized material process; e) an enabling the roll-off container for reloading process; and, f) a loading the roll-off container for transport process;

wherein the method of use for lock with roll off container is a process;

wherein the method of use for lock with roll off container ensures that any cargo loaded into the roll off container is clean;

wherein by clean is meant that the cargo does not include any unauthorized material;

wherein by unauthorized material is meant that the cargo does not include items that carrier was not contracted to transport;

wherein the delivering of the roll-off container to a loading site is completed before the disabling the roll-off container reloading process is initiated;

wherein the disabling of the roll-off container reloading process is completed before loading the roll-off container with cargo process is initiated;

wherein the loading the roll-off container with cargo process is completed before the inspecting loaded cargo for unauthorized materials process is initiated;

wherein the inspecting loaded cargo for unauthorized materials process is completed before the enabling the roll-off container for reloading process is initiated;

wherein the enabling the roll-off container for reloading process is completed before the loading the roll-off container for transport process is initiated.

2. The method of use for lock with roll off container according to claim 1 wherein the delivering of the roll-off container to the loading site involves delivering the roll-off container to the location where cargo is to be collected;

wherein specifically, a truck drives the roll-off container to a previously determined location and positions the roll-off container in a location suitable for use in loading the roll-off container with cargo;

wherein the truck is then detached from a hook mechanism of the roll-off container;

wherein the truck is left in a condition to receive cargo for future transport;

wherein the roll-off container is left in a condition to receive cargo.

3. The method of use for lock with roll off container according to claim 2 wherein the disabling the roll-off container reloading process involves attaching the locking mechanism to the hook mechanism of the roll-off container;

wherein the hook mechanism forms the anchor point of the roll-off container that a truck attaches to load and unload the roll-off container;

wherein the locking mechanism installs on the hook mechanism;

wherein the locking mechanism forms an enclosure around the hook mechanism that prevents a truck from attaching to the hook mechanism;

wherein the locking mechanism is a locking structure that fixes the locking mechanism to the hook mechanism when the locking mechanism is in a locked configuration;

wherein the locking mechanism can be removed from the hook mechanism when the locking mechanism is in an unlocked configuration;

wherein the removal of the locking mechanism from the hook mechanism provides access to the hook mechanism.

4. The method of use for lock with roll off container according to claim 3 wherein the loading the roll-off container with cargo process involves loading the cargo intended for transport into the roll-off container;

wherein the roll-off container receives the cargo in its normal manner;

wherein more specifically, the attachment of the locking mechanism to the hook mechanism does not impede the loading of the cargo into the roll-off container.

5. The method of use for lock with roll off container according to claim 4 wherein the inspecting loaded cargo for unauthorized materials process involves the inspection of the cargo for unauthorized materials;

wherein an appropriate authority physically inspects the cargo for unauthorized materials;

wherein the appropriate authority: a) is an individual authorized to inspect the loaded cargo; and, b) is further authorized to release the locking mechanism from its locked configuration.

6. The method of use for lock with roll off container according to claim 5 wherein the enabling the roll-off container for reloading process involves: a) the completion of the inspection of the cargo; b) the determination by the appropriate authority that the cargo does not contain unauthorized material; and, c) the approval of the appropriate authority to release the locking mechanism;

wherein by releasing the locking mechanism is meant that the locking mechanism is physically unlocked and removed from the hook mechanism.

7. The method of use for lock with roll off container according to claim 6 wherein the loading the roll-off container for transport process involves reloading the released roll-off container with its cargo onto a truck for subsequent transport, and said roll-off container being sent to the proper disposal facility.

* * * * *